(12) United States Patent
Eckart

(10) Patent No.: US 8,215,702 B2
(45) Date of Patent: Jul. 10, 2012

(54) VEHICLE DOOR

(75) Inventor: Gerald Eckart, Maierhöfen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 195 days.

(21) Appl. No.: 12/561,386

(22) Filed: Sep. 17, 2009

(65) Prior Publication Data

US 2010/0066122 A1    Mar. 18, 2010

(30) Foreign Application Priority Data

Sep. 17, 2008  (DE) .......................... 10 2008 047 463

(51) Int. Cl.
*B60J 1/20*  (2006.01)
*G02B 7/182*  (2006.01)
(52) U.S. Cl. ........................................ 296/152; 359/871
(58) Field of Classification Search ................. 296/152, 296/146.6, 1.07, 1.11; 359/871, 872; 248/475.1; D12/187

See application file for complete search history.

(56) References Cited

U.S. PATENT DOCUMENTS 5,889,624 A * 3/1999 Dickenson .................... 359/841
2009/0147388 A1  6/2009 Mendoza

FOREIGN PATENT DOCUMENTS

| DE | 10337476 A1 | 3/2005 |
| DE | 10344707 A1 | 4/2005 |
| DE | 112007000230 T5 | 2/2009 |
| JP | 2000318521 A * | 11/2000 |

OTHER PUBLICATIONS

German Search Report dated Apr. 21, 2009.

* cited by examiner

*Primary Examiner* — H Gutman
(74) *Attorney, Agent, or Firm* — Gerald E. Hespos; Michael J. Porco

(57) ABSTRACT

In the case of a vehicle door with an inside door part and an outside door part which are connected to an inner and outer door shaft reinforcing device, a mirror base of a vehicle exterior rearview mirror is held at a corner of the door. The mirror base is supported on a reinforcing element arranged within the vehicle door. The reinforcing element is arranged between a support of the outer door shaft reinforcing device and a further support of the inner door shaft reinforcing device.

6 Claims, 4 Drawing Sheets

VEHICLE DOOR

CROSS-REFERENCE TO RELATED APPLICATION

This application claims the priority, under 35 U.S.C. §119, of German application DE 10 2008 047 463.0, filed Sep. 17, 2008; the prior application is herewith incorporated by reference in its entirety.

BACKGROUND OF THE INVENTION

Field of the Invention

The invention relates to a vehicle door having a vehicle exterior rearview mirror. The vehicle door contains an inside door part and an outside door part and the parts are connected to inner and outer door shaft reinforcing devices.

Published, non-prosecuted German patent application DE 103 44 707 A1 discloses a vehicle door with an inside door part and a window frame part. The vehicle door has a composite mirror strut which has a mirror holding region and window base edge reinforcing region, and the mirror holding region is arranged in the region of a mirror triangle of the vehicle door.

SUMMARY OF THE INVENTION

It is accordingly an object of the invention to provide a vehicle door which provides a fastening for an exterior rearview mirror for a motor vehicle on a vehicle door. The fastening ensures support for the mirror in a manner free from shaking. Furthermore, the fitting of the mirror fastening is to be carried out in a simple manner.

With the foregoing and other objects in view there is provided, in accordance with the invention, a vehicle door. The vehicle door contains a vehicle exterior rearview mirror, an outer door shaft reinforcing device having a support, an inner door shaft reinforcing device having a further support, an inside door part, and an outside door part. The inside and outside door parts are connected to the inner and outer door shaft reinforcing devices. A reinforcing element is fastened between the support of the outer door shaft reinforcing device and the further support of the inner door shaft reinforcing device and with the inside door part. A mirror base is provided for the vehicle exterior rearview mirror and is supported on the reinforcing element.

The advantages primarily achieved by the invention are that, by use of a reinforcing element which is inserted into the door, a vehicle door region which holds the mirror base is reinforced in order to prevent "shaking vibrations" of the mirror. This is achieved according to the invention by the mirror base being supported on a reinforcing element which is arranged within the vehicle door and is fastened between a support of the outer door shaft reinforcing device and a further support of the inner door shaft reinforcing device and the inside door part. In particular, according to the invention the reinforcing element contains a shaped part which is in the form of an angled profile and is of an integral configuration.

According to a further refinement of the invention, the reinforcing element has a first limb with a supporting surface which faces the support of the outer door shaft reinforcing device and, at the free end, surrounds an edge surface section which is connected to the support of the inner door shaft reinforcing device and is fastened to the inside door panel.

Furthermore, it is provided according to the invention that a second limb bent from the first limb of the reinforcing element has, at the free end, a supporting surface of an angled edge web, which supporting surface faces the inside door panel. By this arrangement of the reinforcing element and of the connection to the supports of the outer and inner door shaft reinforcing devices and the inside door panel, a stable junction point is formed in the corner region of the vehicle door, in which junction point the mirror base is mounted. For this purpose, the mirror base of the vehicle exterior rearview mirror is connected via at least one screw fastening to the reinforcing element and to the support of the outer door shaft reinforcing device, with the screw fastening being arranged adjacent to a beveled edge to the second limb of the reinforcing element.

The reinforcing element which bears with its first limb extensively on the support of the outer door shaft reinforcing device contributes in particular to the stable junction point according to the invention. Furthermore, the reinforcing element with the edge surface section on the first limb and with the edge web on the second limb is provided on both sides of the mirror base with respective supporting device which form a relatively large supporting base. In particular, the reinforcing element together with the support of the inner door shaft reinforcing device and the inside door panel forms a hollow support with a clearance which has a different width. The screw fastening takes up a position directly adjacent to the second limb of the reinforcing element and is therefore mounted in a stable region.

The reinforcing element is fastened to the supports of the door shaft reinforcing device and the inside door panel via a cohesive material joint and/or via a glued joint.

The reinforcing element can be fitted into the vehicle door in a simple manner without existing door components being modified or changed in position.

Other features which are considered as characteristic for the invention are set forth in the appended claims.

Although the invention is illustrated and described herein as embodied in a vehicle door, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
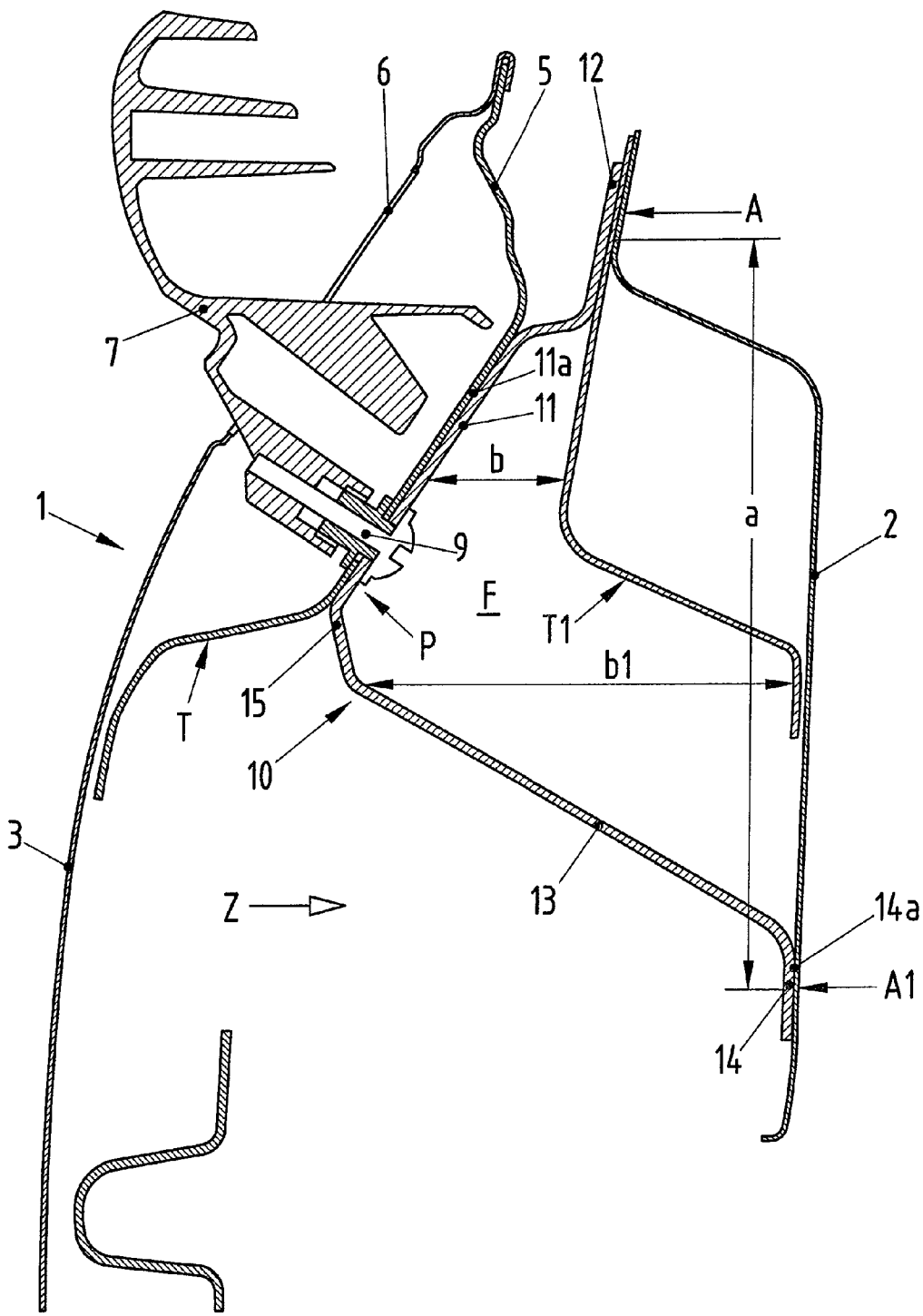
FIG. 1 is a diagrammatic, vertical sectional view through a vehicle door with a reinforcing element disposed between supports of door shaft reinforcing devices according to the invention.
Figure 2:
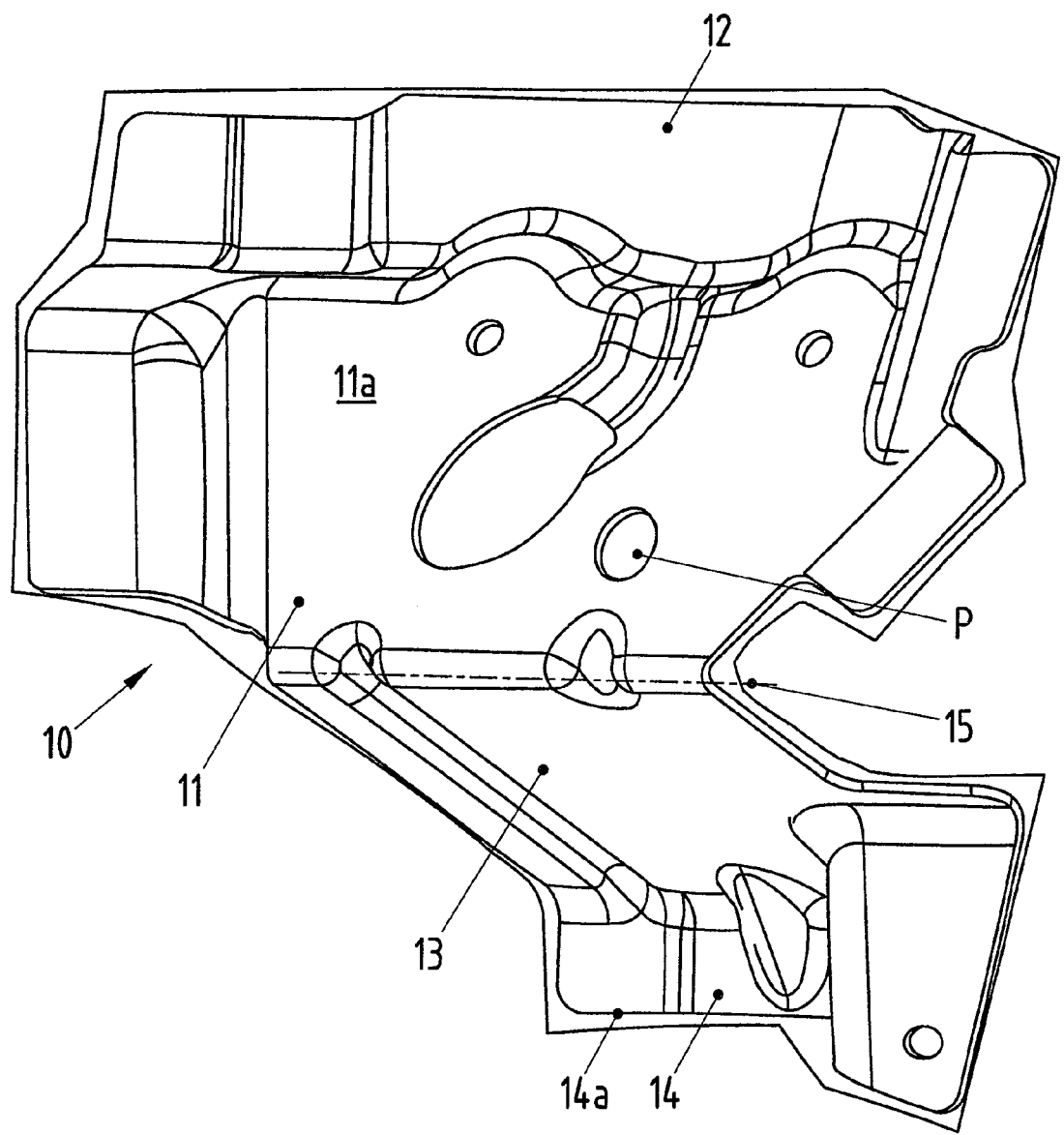
FIG. 2 is a diagrammatic, perspective view of the reinforcing element in the arrow direction Z, as seen from the outside.
Figure 3:
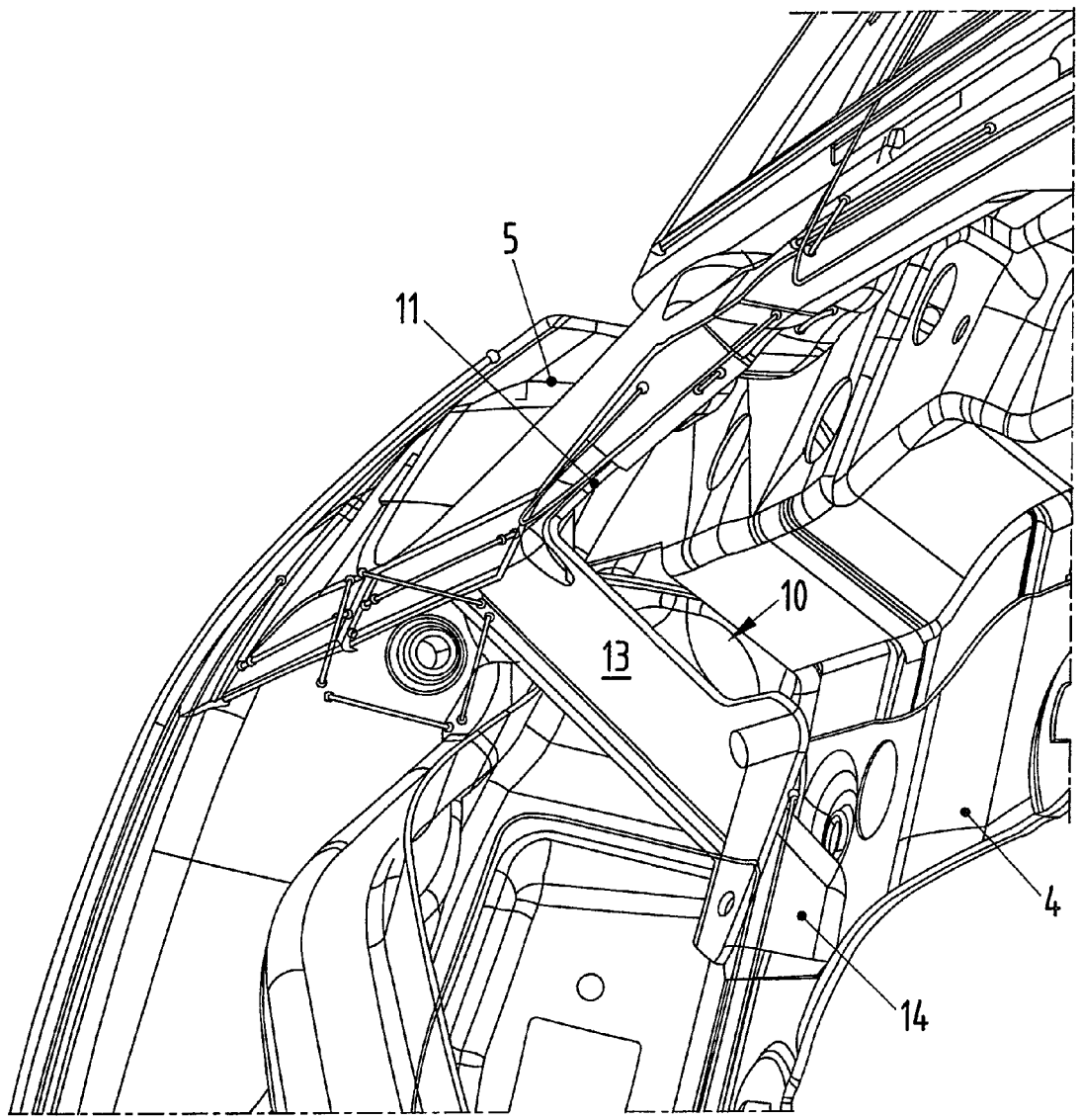
FIG. 3 is a diagrammatic, bottom perspective view of the reinforcing element.
Figure 4:
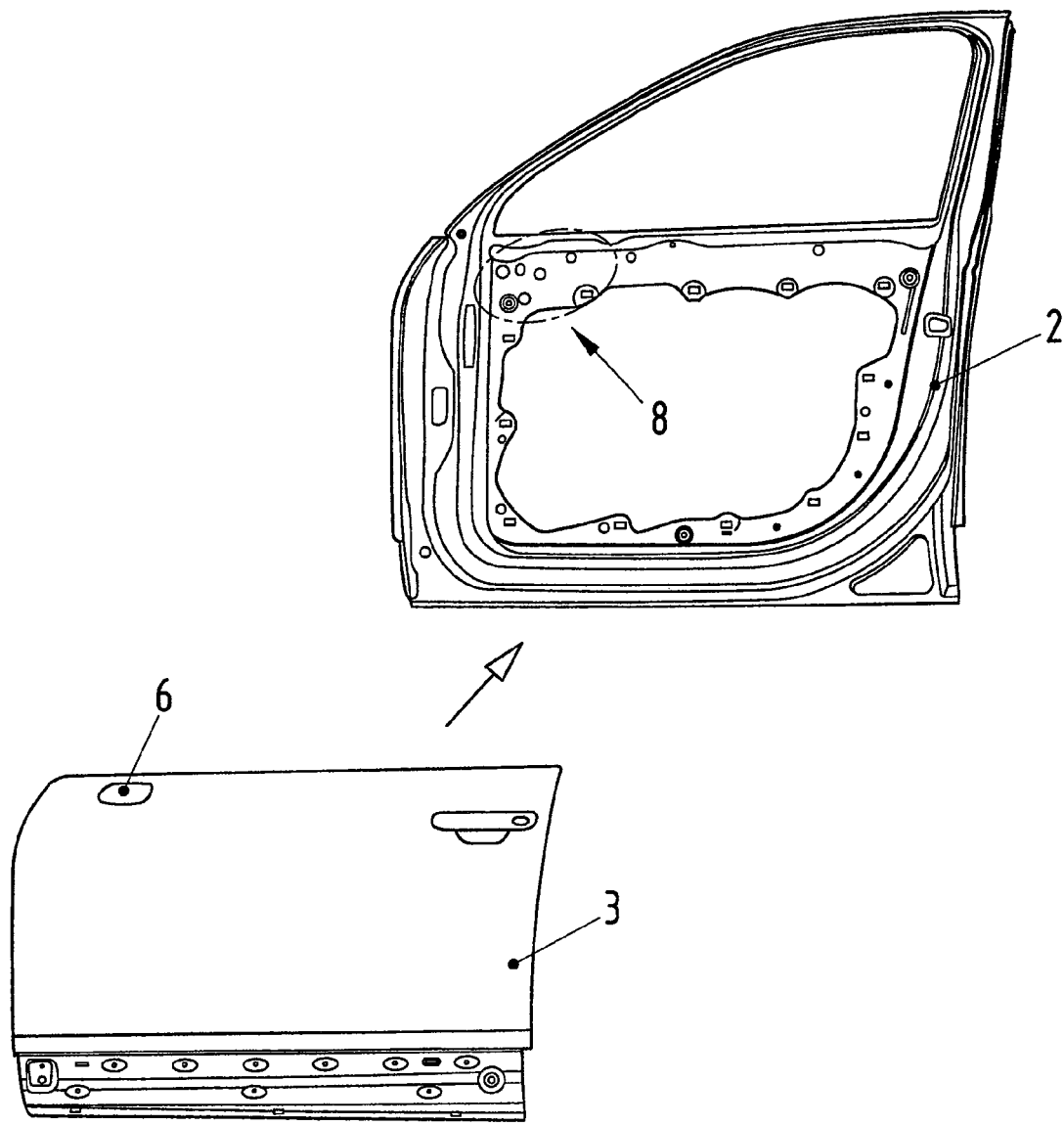
FIG. 4 is a diagrammatic, exploded view from the outside of the inside door part with the outside door part put in front.

Referring now to the figures of the drawing in detail and first, particularly, to FIG. 1 thereof, there is shown a vehicle door 1 that contains an inside door part 2 and an outside door part 3 and supports T, T1 arranged in between. The supports T, T1 define or are parts of an inner door shaft reinforcing device 4 and of an outer door shaft reinforcing device 5, respectively. An opening or a cutout 6 for a mirror base 7 of a vehicle exterior rearview mirror is arranged in the outside door part 3. The mirror base is held in a front, upper corner region or door corner 8 of the vehicle door 1 via at least one fastening device or a screw fastening 9 on an inner reinforcing element 10.

The reinforcing element 10 is configured as a single-piece steel or aluminum part and is of an essentially angled configuration and has a first limb 11 with an edge surface section 12 and a second limb 13 with an edge web 14.

The first limb 11 of the reinforcing element 10 is connected extensively via the surface 11a to the support T of the outer door shaft reinforcing device 5 and the adjoining edge surface section 12 is fastened to the support T1 of the inner door shaft reinforcing device 4. The second limb 13 of the reinforcing element 10 is held with the angled edge web 14 on the inside door part 2 which is also connected at the upper, free end to the edge surface section 12 of the reinforcing element 10.

The reinforcing element 10 together with the edge surface section 12 and the edge web 14 forms a supporting device A and A1 on either side of the screw fastening 9 of the mirror base 7, the supporting device resulting overall in a supporting base having a given width a.

A hollow support with the widths b and b1 is formed in a clearance F between the reinforcing element 10 and the supports T and T1 of the door shaft reinforcing device 4 and 5 and the inside door part 2, the hollow support having an overall stiffening effect on the fastening point P of the mirror base 7.

The reinforcing element 10 is connected to the supports T and T1 of the door shaft reinforcing devices 4 and 5 with a cohesive material joint and/or by a glued joint.

The connection of the mirror base 7 via the screw fastening 9 takes place in the first limb 11 directly adjacent to a beveled edge 15 to the second limb 13.

The invention claimed is:

1. A vehicle door, the vehicle door comprising:
a vehicle exterior rearview mirror;
an outer door shaft reinforcing device having a support;
an inner door shaft reinforcing device having a further support;
an inside door part;
at least one screw fastening;
an outside door part, said inside and outside door parts connected to said inner and outer door shaft reinforcing devices, said outside door part having a cutout formed therein; said cutout formed below a waistline of said door part;
a reinforcing element fastened between said support of said outer door shaft reinforcing device and said further support of said inner door shaft reinforcing device and with said inside door part, said reinforcing element being an angled shaped reinforcing element, said reinforcing element having a first limb with an edge surface section and a second limb with and edge web, said edge surface section fastened to said inner door shaft reinforcing device and said edge web fastened to said inside door part, said first limb further having a supporting surface adapted to, bearing on and covering an extensive surface area of said outer door shaft reinforcing device; and
a mirror base for said vehicle exterior rearview mirror and supported on said reinforcing element, said mirror base guided through said cutout disposed below said waistline and connected via said at least one screw fastening to said reinforcing element and to said support of said outer door shaft reinforcing device.

2. The vehicle door according to claim 1, wherein said reinforcing element with said edge surface section on said first limb and with said edge web on said second limb define a supporting device disposed on both sides of said mirror base.

3. The vehicle door according to claim 1, wherein said reinforcing element together with said further support of said inner door shaft reinforcing device and with said inside door part forms a hollow support with a clearance and widths.

4. The vehicle door according to claim 1, wherein said reinforcing element is fastened to said support, said further support, and said inside door part via at least one of a cohesive material joint and a glued joint.

5. The vehicle door according to claim 1, wherein:
said inside door part has a front door corner;
said reinforcing element is disposed in a region of said front door corner of said inside door part; and
said front door corner faces said cutout for said mirror base in said outside door part.

6. The vehicle door according to claim 1,
wherein said second limb has a beveled edge; and
wherein said screw fastening being disposed adjacent to said beveled edge of said second limb of said reinforcing element.

* * * * *